United States Patent

[11] 3,596,693

[72] Inventor William H. Baker
 Mentor, Ohio
[21] Appl. No. 722,267
[22] Filed Apr. 18, 1968
[45] Patented Aug. 3, 1971
[73] Assignee American Specialty Foods, Inc.
 Wilmington, Del.

[54] MUSHROOM-HANDLING APPARATUS
 23 Claims, 12 Drawing Figs.
[52] U.S. Cl. ................................................. 146/78,
  146/81
[51] Int. Cl. ........................................... A23n 15/04
[50] Field of Search ........................................ 146/78, 81

[56] References Cited
UNITED STATES PATENTS
3,304,973 2/1967 Norris ........................... 146/81
3,319,680 5/1967 Coleman et al. ............... 146/81
1,400,290 12/1921 Johannes ....................... 146/78 UX
2,978,003 4/1961 Benekam ....................... 146/81
2,989,997 6/1961 Buchner et al. ................ 196/81 X
3,164,182 1/1965 Hughes et al. ................. 146/81

Primary Examiner—Andrew R. Juhasz
Assistant Examiner—F. R. Bilinsky
Attorney—Browdy and Neimark ABSTRACT: An apparatus is disclosed for handling mushrooms hydraulically in a tank or series of tanks by generally flowing the mushrooms from a mushroom reservoir in an upstream location through a series of devices to a final downstream location where the mushrooms are cut to remove the roots and to separate the stems from the caps. The apparatus includes a device for controlling the rate and quantity movement of the mushrooms which are being hydraulically fed; a device for axially orienting the mushrooms into at least one row along a single axis; a device for directionally orienting the axially oriented mushrooms so that the caps face in the same direction, such as downstream; a device for receiving the directionally oriented mushrooms and for uniformly refeeding them sequentially in timed relationship, preferably in a cap down position; a device for receiving the mushrooms in a cap down position and reversing them to a cap up position; and a device for carrying the mushrooms in the cap up position past cutting blades which first cut off the roots and then separate the stems from the caps.

INVENTOR
WILLIAM H. BAKER

ATTORNEY

FIG. 3

INVENTOR
WILLIAM H. BAKER

ATTORNEY

INVENTOR
WILLIAM H. BAKER

Patented Aug. 3, 1971

INVENTOR
WILLIAM H. BAKER

BY *Alvin Browdy*

ATTORNEY

MUSHROOM-HANDLING APPARATUS

The present invention relates to a mushroom-handling apparatus and, more particularly, to a system for handling mushrooms hydraulically and including controlling the feed rate, orienting the mushrooms, feed-stepping the mushrooms to a cutter, and then cutting the mushrooms.

Many mushroom-handling and trimming devices have been contemplated in the prior art because of the great need for automating the conventionally used systems of grading, handling, and trimming mushrooms by hand. All such prior art devices have, insofar as is known, failed in their intended objective of automating the handling and trimming of mushrooms. Part of the problem resides in the particular characteristics of mushrooms themselves; they retain some surface dirt even after having been cleaned and they are very fragile. The prior art devices have uniformly been subjected to clogging from dirt particles from the mushrooms; they have also caused problems due to injuring mushrooms because of their very fragile nature.

Some types of mushroom-handling and trimming devices contemplated have included dial-type mushroom cutters; such devices are not only slow, but require hand insertion of the mushroom into the cutter carrier and thus the devices are, at best, only semiautomatic. Manual feeding is an expensive and time consuming operation.

It is, accordingly, an object of the present invention to obviate the deficiencies of the prior art, such as indicated above.

It is another object of the present invention to provide for a mushroom-handling system which is entirely automatic, and which is fast, self-cleaning, flexible in its use and is dependable.

It is another object of the present invention to provide for the novel handling of mushrooms in an unobvious manner.

It is another object of the present invention to provide a novel and unobvious apparatus for the handling of mushrooms hydraulically.

It is another object of the present invention to provide for a mushroom-handling and cutting apparatus which is capable of handling and cutting mushrooms in a fast, economical and dependable manner.

These and other objects and the nature and advantages of the present invention will become more apparent from the following detailed description taken in conjunction with the drawings wherein:

An illustrated embodiment of a mushroom apparatus in accordance with the present invention is shown in the drawing and comprises, in general, an elongated mushroom reservoir tank 10, a suitable means 20 for controlling the rate and quantity movement of mushrooms being fed from the reservoir 10, a means 30 for axially orienting the mushrooms into at least one row of mushrooms each row along a single axis, a device 40 for directionally orienting the axially oriented mushrooms so that the cap of each mushroom is facing in the same direction, a feed-stepping device 50 for receiving the directionally oriented mushrooms and for uniformly refeeding such mushrooms sequentially in timed relationship with one another, an inverting or reversing conveyor 60, and a cutting conveyor 70 including suitable cutting devices located along the path thereof. It should be understood that not all of the above-mentioned components are essential, and that the single illustrated embodiment may be changed, certain portions replaced by others and certain portions deleted without exceeding the scope of the invention. It is an important aspect of the present invention, however, that the mushrooms being handled be conveyed hydraulically.

In essence, the apparatus of the present invention performs two complex functions, entirely automatically. It indexes the mushrooms, such that they are fed into the trimming or cutting mechanism at the proper rate, in the proper position and one at a time. And it trims or cuts the mushrooms, by severing the root from the stem at a predetermined distance measured up the stem from the bottom of the root, and by severing the stem from the cap at a predetermined distance measured down the stem from the underside of the cap.

The present apparatus is designed to handle mushrooms automatically which mushrooms have already been thoroughly washed. Also, all clump mushrooms prior to being fed to the present apparatus will have been separated into individual mushrooms and all broken mushrooms will have been removed. Furthermore, the mushrooms will have been graded into individual grades (sizes) of mushrooms based primarily on the diameter of the mushroom caps. Accordingly, the following description presupposes treatment of individual, washed mushrooms having a given and generally consistent cap diameter.

Once the mushrooms have been graded, each of the sizes is handled separately in a different apparatus, each being in accordance with the present invention and adapted to handle mushrooms of a particular size. Thus, mushrooms of a given size are passed into a holding tank or reservoir 10 of relatively large size which has an upstream wall 102, a bottom wall 104 and a downstream wall 106. Water is fed through an inlet port 108, preferably in the upstream wall 102, to provide a head of water for continuously hydraulically conveying the mushrooms which are preferably fed to the tank 10 from above, but which may be fed through the inlet port 108 a'ong with the water. Sufficient water is fed through the inlet 108 to provide a water level 110 sufficiently high to permit mushrooms, floating at the water level 110, to be passed downstream from the reservoir and along the horizontal inlet plate 112 over the downstream wall 106 and to the rate-controlling means 20. Water spray devices, shown illustratively in FIG. 1, may also be provided to assist in the movement of mushrooms from the reservoir 10 over the horizontal plate 112 and to the rate controlling means 20.

Figure 1:
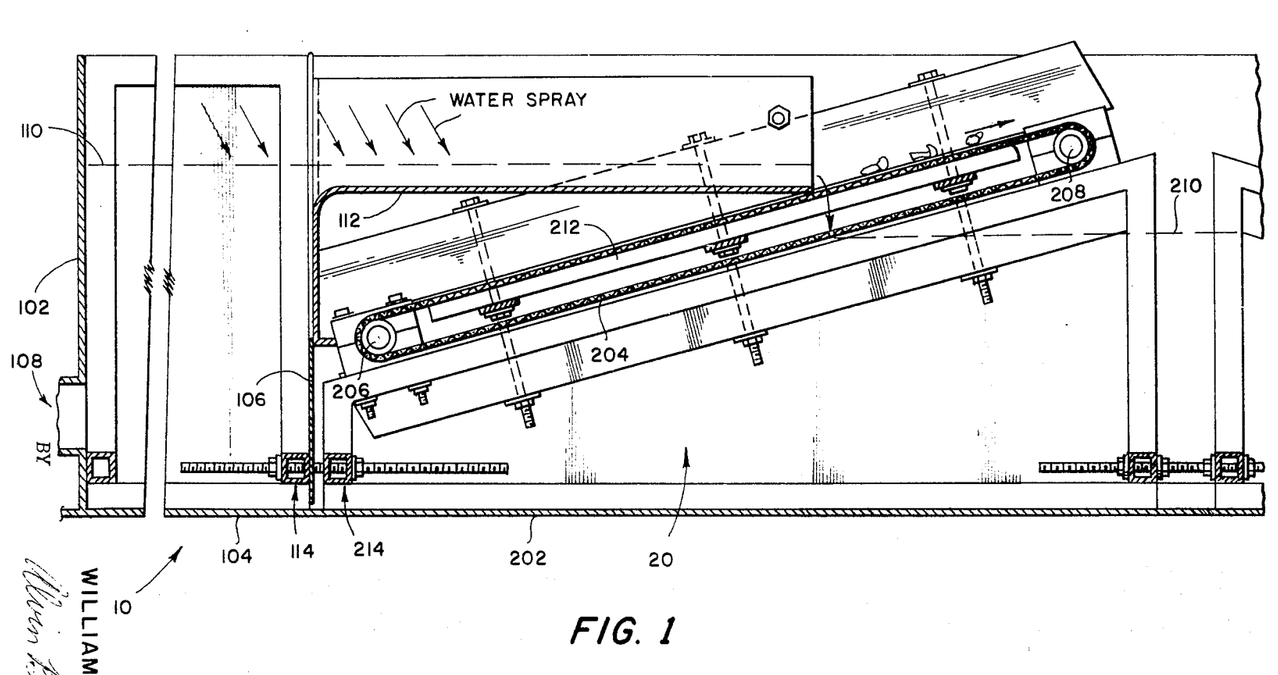
FIG. 1 is a vertical sectional view of a reservoir means and a portion of a means for controlling the rate and quantity movement of mushrooms in an embodiment in accordance with the present invention.

The reservoir 10 provides the system with some flexibility since any of the downstream components may be shut down for repairs, if necessary, and mushrooms being graded upstream can continuously be fed to the reservoir 10 where they will merely accumulate until the indexing and trimming portions of the apparatus are again started. As a specific example, the reservoir 10 may be approximately 14 feet long by 30 inches wide by 24 inches deep, and may contain water to a depth of approximately 18 inches.

Figure 2:
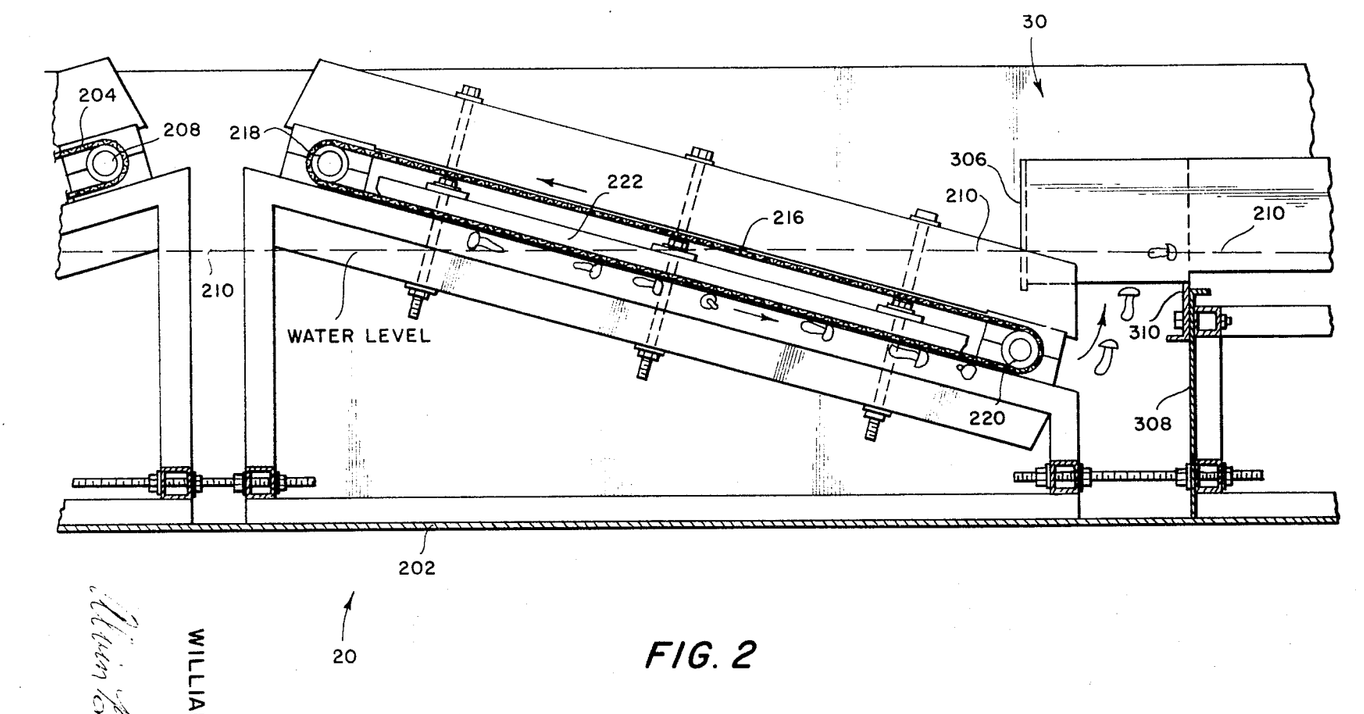
FIG. 2 is a vertical sectional view of a portion of an embodiment of the apparatus downstream from FIG. 1 and showing a portion of a means for controlling the rate and quantity movement of the mushrooms and a portion of a means for axially orienting the mushrooms.

The means 20 for controlling the rate and quantity movement of the mushrooms being continuously hydraulically fed comprises, disposed in a water holding tank 202, which physically may be a mere extension of the reservoir tank 10, a first endless foraminous belt 204, moved in a clockwise direction and supported by the wheels 206 and 208. Suitable supporting devices are provided to maintain the endless permeable conveyor 204 and the wheels 206 and 208 in their proper position as illustrated with the upstream end of the endless belt 204 supported by the wheel 206 beneath the level 210 of water in the tank 204 and with the downstream end of the foraminous belt 204 supported by the wheel 208 extending above the water level 210 in the tank 202. Supporting the top flight of the permeable conveyor 204 is a suitable wear strip 212 which maintains such top flight of the belt 204 in proper position and prevents the sagging thereof. Any suitable water permeable conveyor belt 204 may be used, but a screen wire, such as one made of stainless steel, is preferred.

If desired, the various tanks and/or other structural devices located along the length of the apparatus of the present invention may be bolted together for convenience such as is illustrated by the bolting device 114, 214 which include threaded positioning rods for longitudinally adjusting the position of one device with respect to another. The provision of various equipment tanks, preferably formed of stainless steel along with the other metallic components of the apparatus, bolted together, permits more simplified repair of the device by removing vertically upwardly, after unbolting, any portion of the apparatus in need of repair. The various positioning rods permit a great deal of variation in the relative locations of the different elements. Thus, for example, the horizontal inlet plate 112 is preferably made vertically adjustable over a range of about 4 inches.

Immediately downstream from the first endless conveyor belt 204, there is provided a second permeable endless conveyor belt 216, supported and moved by an upstream wheel 218 and a downstream 220, themselves suitably supported. The second and downstream conveyor belt 216 is exactly like the upstream belt 204 except that its bottom flight is supported by a wear strip 222, rather than its top flight, and the upstream end of the belt 216 is supported above the water level 210 while the downstream end, supported by the wheel 220, is maintained below the water level 210.

The height of the horizontal inlet plate 112 is adjusted such that the level of water flowing thereover is just deep enough to float a single layer of mushrooms from the reservoir 10. Accordingly, water and mushrooms flow from the reservoir 10 over the inlet plate 112 until the mushrooms come in contact with permeable endless conveyor belt 204 moving in a clockwise direction. Water will flow easily through the open mesh of the water permeable belt but the mushrooms will be retained thereon. Accordingly, the mushrooms will be permitted to pass over the inlet plate 112 only as fast as the wire belt 204 will carry them above the water level and away. Therefore, the speed of movement of the wire belt 204 will determine the rate at which mushrooms can move from the reservoir 10 and into the indexing portions of the apparatus.

As the mushrooms pass over the upstream end of the belt 204 above the wheel 208 they drop off into the water therebelow and float along the water level 210 to beneath the downstream conveyor belt 216 which, rotating in a counterclockwise direction, carry the mushrooms as illustrated beneath the water level 210. The mushrooms are then discharged at the downstream end from beneath the lower flight of the belt 216 immediately below the wheel 220 and thereupon float again to the surface 210, but within the upstream portion of the axially orienting means 30. It will be understood that the buoyancy of the mushrooms will urge the mushrooms upwardly towards the water level at all times, since the specific gravity of the mushrooms is less than that of the water.

Figure 7:
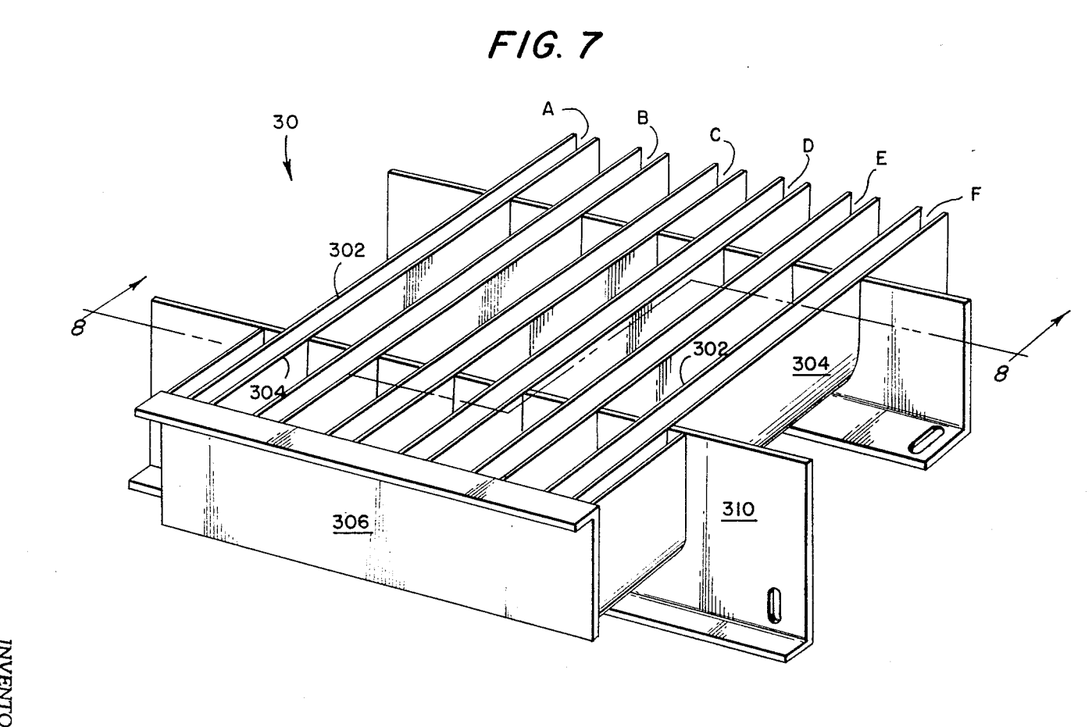
FIG. 7 is a perspective view of the axial orienting means shown in FIGS. 2 and 3.
Figures 8, 9:
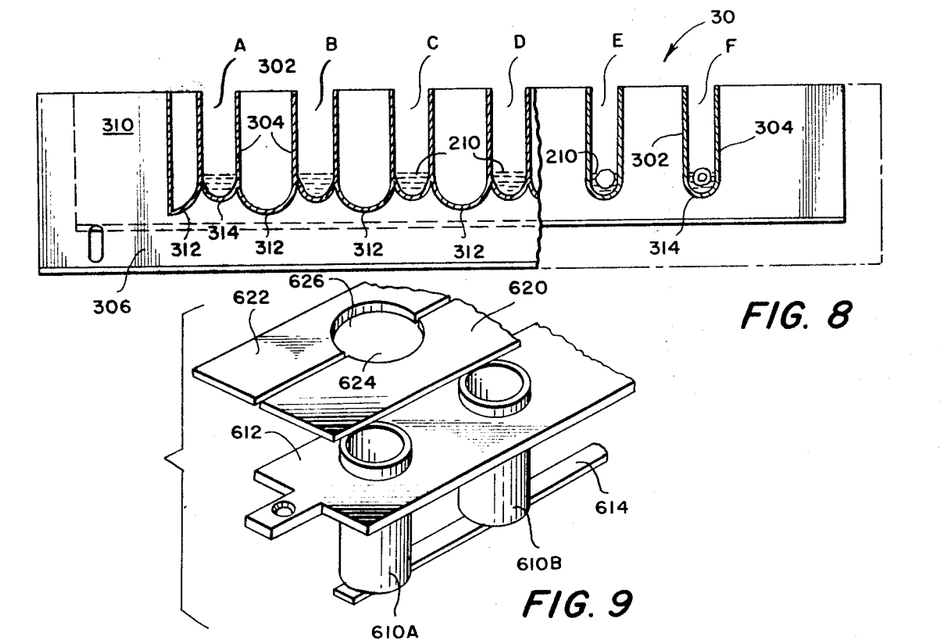
FIG. 8 is a sectional view taken along line 8—8 of FIG. 7.
FIG. 9 is an exploded view of a detail of the inverting or reversing conveyor shown in FIGS. 3 and 4.
Figure 10:
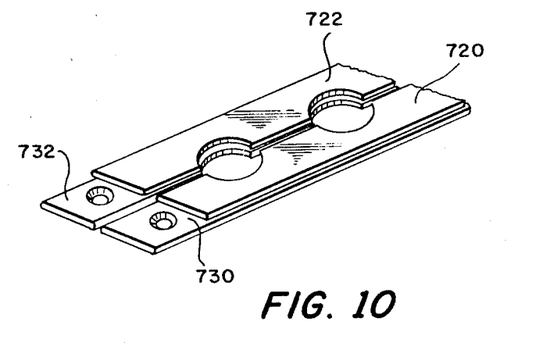
FIG. 10 is a detail view of an element of the cutter conveyor shown in FIGS. 4—6.

Whereas, in the illustrated embodiment, the reservoir 10 and the endless permeable belts 204 and 216 are all relatively wide, the axially orienting means 30 is necessarily narrow in width and, in order to handle the desired capacity leaving the downstream bottom end of the belt 216, it is desirable in the axial orienting means 30 to provide a plurality of axially orienting devices in side-by-side relation, such as the six longitudinally extending flumes A, B, C, D, E and F shown in FIGS. 7 and 8.

Each of such flumes which comprise the means 30 for axially orienting the mushrooms into rows along single axes include a pair of side walls 302 and 304 which are generally vertical and extend longitudinally along the path of movement of the mushrooms. These walls 302 and 304 are so spaced that they are at a distance approximately slightly greater than the average cap diameter of the mushrooms being handled. The bottoms of the walls also extend slightly beneath the water level 210 in the tank 202 to a depth about one-half to 1 times the average mushroom cap diameter. A first transverse vertical baffle 306 is provided at the upstream end of the walls 302 and 304 defining the flumes and such transverse baffle is provided so as to lie above the downstream end of the second water permeable endless conveyor belt 216. Noting FIG. 2 it is seen that the baffle 306 extends partly beneath the water level 210.

A second vertical baffle is provided downstream from the first vertical baffle 306 and, in the illustrated embodiment, comprises a tank-separating wall 308 and a baffle wall 310, the former supporting the latter and the latter supporting the flumes. In addition to the downstream vertical baffle 308—310, a plurality of longitudinally extending generally U-shaped baffles 312 are provided connecting the bottoms of adjacent vertical wall members 302 and 304 between adjacent pairs of such U-shaped wall members; in other words, a longitudinally extending U-shaped baffle 312 connects wall 304 of flume A with wall 302 of flume B. Such U-shaped baffles 312 are located beneath the water level 210 as shown in FIG. 8. While such baffles 312 may extend downstream (not shown) from the second vertical transverse baffle 310, such structure is not necessary and performs no function at such location downstream from the second vertical baffle 310. On the other hand, downstream from the vertical baffle 310 it is necessary that each flume be provided with a bottom 314, preferably also of U-shape for maintaining cleanliness and superior flow conditions.

Thus, between the vertical baffles 306 and 310, the bottoms of the flumes are open while the space between the flumes is closed by suitably curved surfaces 312. Therefore, as the mushrooms come off the end of the wire belt conveyor 216 and bobble to the surface 210, they float up into one of the flumes, being guided by the curved surfaces or baffles 312 located between adjacent flumes. The downstream vertical baffle 310 (as well as the wall 308 therebeneath) blocks the flow of the water forcing it to flow through the open bottoms of the flumes along with the mushrooms. The bottoms of the flumes being closed by bottom walls 314 downstream from the second vertical baffle 310, once the mushrooms and water are in the flumes they are forced to remain therein. Since the flumes are only slightly wider than the diameter of the caps of the particular size of mushrooms being handled, the mushrooms will align themselves with their long dimension parallel to the walls of the flumes as they rise into the flumes, and the mushrooms will be conveyed through the flumes either cap first or root first and, accordingly, a row of mushrooms all axially oriented is provided in each flume.

As the mushrooms leave the downstream end 320 of each of the flumes of the axially orienting means 30 they pass to the means 40 for directionally orienting the mushrooms so that the cap of each mushroom is facing in the same direction. Noting particularly FIGS. 3, 3A, and 3B, it will be seen that such means 40 for directionally orienting the previously axially oriented mushrooms comprises, as illustrated, a pair of segmented conveyor belts 402 and 404 which have a coplanar horizontal top flight and which define therebetween a space sufficiently great to receive the stem of the average stem diameter mushroom being handled, such space not being big enough to receive the average cap diameter of the mushrooms. The endless segmented belts 402 and 404 pass about support wheels 406 and 408 which are provided with horizontal axes 410 and 412 respectively. The wheels 406 and 408 are, in turn, provided with suitable supports which lie within the tank 414 which, in turn, may be merely an extension of the tank 202 separated by the baffle wall 308. It will, of course, be understood that a separate pair of segmented conveyor belts 402, 404 are provided for each flume A, B, C, etc.

Figure 3:
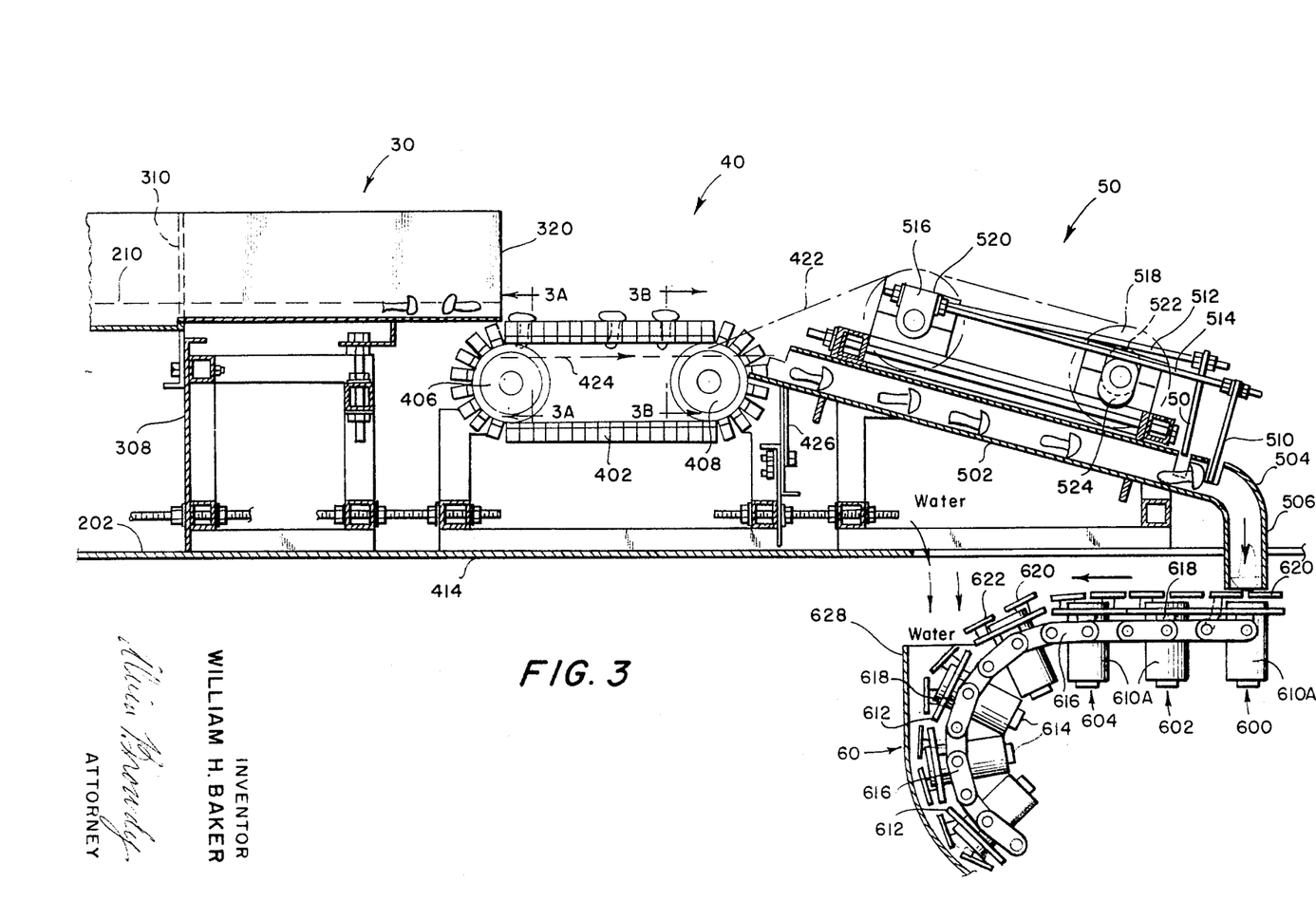
FIG. 3 is a vertical sectional view of an embodiment of the apparatus downstream from FIG. 2 and showing a portion of an axially orienting means, a directional orienting means, a feed-stepping means (a device for uniformly refeeding mushrooms sequentially in time relationship) and a reversing conveyor means.
Figure 3A:
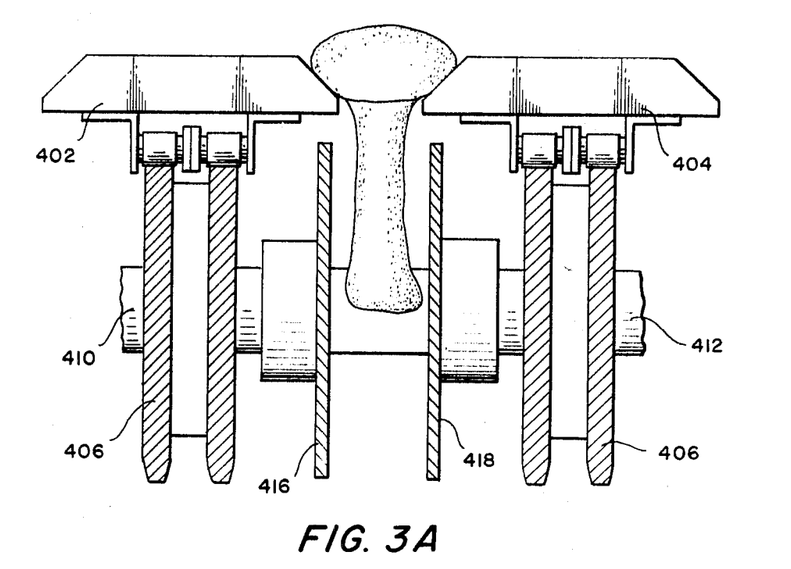
FIGS. 3A and 3B are vertical sectional views taken along lines 3A and 3B, respectively of FIG. 3 showing the directional orienting means of FIG. 3.
Figure 3B:
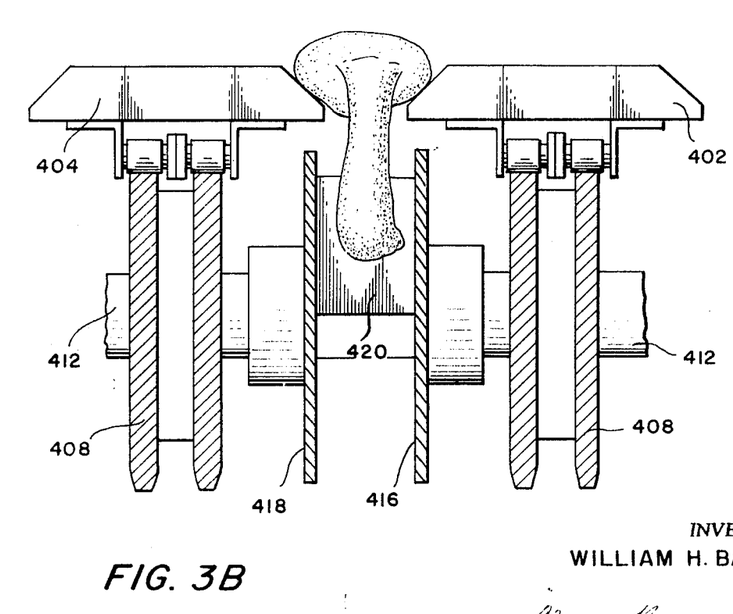

As illustrated in FIGS. 3A and 3B, it is preferred that the segmented portions of the belts 402 and 404 be provided with a truncated, inverted V-shape as illustrated and that such belts thereby define therebetween the aforementioned space having a truncated V-shape. As illustrated, the walls of the conveyor segments forming the truncated V supports the cap of the mushroom. Extending below the truncated V are a pair of vertical guide plates 416 and 418, the purpose of which is to restrain any pendulum swinging of the mushroom stem sufficient to permit the mushroom to rotate sufficiently so that the cap might fall through the truncated V; such vertical guide plates being rigidly mounted with respect to the supporting structures. As the downstream end of the endless conveyor belts 402 and 404, associated with the wheels 408 and rigidly located between the vertical guide plates 416 and 418, is a stem stop means 420 which is preferably merely a curved plate, although it may be a rotating wheel. The conveyors 402 and 404 may be driven by suitable motor means through any suitable linkage such as a driving belt 422 acting upon the wheels 408.

As the mushrooms leave the flumes of the axial orienting device 30 at the water level 210, either root first or cap first, they drop down onto the pairs of spaced endless conveyor belts 402 and 404, the horizontal spacing of which, as pointed out above, is such that the mushroom cap is too large to fall through the space between the conveyors. As the mushrooms are conveyed along the conveyor, the root and stem fall through while the cap remains supported. In the meantime, the water falls through into the tank 414 and reaches a new and lower level 424 which is sufficiently below the top flight of the endless segmented conveyors 402 and 404 so that the roots of the suspended mushrooms clear such water level.

As the mushrooms are conveyed downstream by the movement of the conveyors 402 and 404 in the clockwise direction as viewed in FIG. 3 and reach the downstream end of the top flight of such conveyors, the stems engage the stem stop means 420 causing the mushrooms to fall off the downstream end of the top flight of the conveyors 402 and 404 cap first. Therefore, the mushrooms will enter the feed-stepping device 50 cap first. The vertical guide plates 416 and 418 prevent any substantial side sway of the stems which might allow the caps to fall through the V-space as the mushrooms travel the length of the conveyor. The stem stop means 420, being in the form of a plate, serves to hold the vertical guide plates 416 and 418 in position. Suitable baffle means 426 are provided near the downstream end of the conveyors 402 and 404 to maintain the water level 424 in the tank 414.

The means 50 for receiving the directionally oriented mushrooms and for the refeeding the mushrooms sequentially in timed relationship with one another comprises, for each pair of spaced conveyors 402 and 404, a downwardly sloping tube 502, preferably of circular cross section and having a curved portion 504 near the bottom thereof and terminating in a straight vertical section 506. The tube 502 preferably has an internal diameter only slightly greater than the average cap diameter of the mushrooms being handled. The upstream mouth of the tube 502 is so located that it opens below the water level 424 causing some flow of water to pass into and through the tube 502 along with the mushrooms.

Near the downstream end of the tube 502 and immediately above the bend 504 therein is located a first gate 508 and a second gate 510 which gates are provided with respective openings in the wall of the tube 502 for the passage therethrough of such gates 508 and 510. As can be seen, the first gate 508 and the second gate 510 are spaced relatively closely together a distance apart only slightly greater than the average cap height of the mushrooms being handled.

Suitable means are provided to synchronously open and close the first and second gates so that one gate is always closed. Such means includes a rocker arm 512 for the first gate 508 and a rocker arm 514 for the second gate 510. As illustrated, the rocker arms are anchored at one end 516 by either a resilient coupling, a hinged joint, a ball and socket joint, or the like, such as to permit the rocker arms 512 and 514 to move at their downstream ends to which the gates 508 and 510 are respectively connected while being restrained from any motion (other than rotary motion) at their upstream end 516, the rocker arms 512 and 514 being biased to retain such gates 508 and 510 closed.

A rotating wheel 518 is provided, synchronized with the cutting device (described below), and also preferably connected via an upstream wheel 520 through the belt 422 to the wheel 408 of the directional orienting means 40. The downstream wheel 518 is provided with a pair of cam surfaces 522 and 524, such cam surfaces being axially spaced and each being adapted to contact only one of the rocker arms 512 and 514 respectively. Accordingly, it will be seen that as the wheel 518 rotates, the rocker arms being constantly urged downwardly such as by the upstream resilient connection 516, the cams 522 and 524 pass through four quadrants in each rotation of 360° to provide: (1) as illustrated in FIG. 3 the second gate 510 is closed (down) while the first gate 508 is open (up); (2) as the wheel 518 rotates at 90° clockwise, both gates 508 and 510 will be closed (down); (3) as the wheel 518 rotates another 90° the cam 524 will urge the second gate 510 upwardly while the first gate 508 remains closed; and (4) after another 90° rotation both are again closed; and (5) the last 90° rotation brings the apparatus to the position illustrated in FIG. 3 with the first gate 508 open and the second gate 510 closed.

As they leave the belts 402 and 404 at the downstream end of the directionally orienting means 40, the mushrooms are turned cap first into the mouth of the tube 502. The vertical wall 426 maintains the water level 424 such that some of the water will flow through the tubes 502 while the remainder simply spills over and between such tubes and then to the cutting apparatus therebelow as shown by the arrows W in FIG. 3. The tubes 502 trap the mushrooms and convey them, cap first, to the reversing or inverting conveyor 60 of the trimming mechanism, the movement of the mushrooms being facilitated by the flow of water through the tubes 502.

As indicated above, the gates 508 and 510 work in synchronism with the cutting mechanism to pass one mushroom at a time, at the proper time, to the cutting mechanism, the cams 522 and 524 being positively timed with the cutting mechanism. One of the gates 508 and 510 is always closed (down). The space between the gates being wide enough to contain therebetween one mushroom cap, the stem of such mushroom thereby protrudes beneath the gate 508. The two gates rise, one and then the other, trapping a cap between, then passing it on to the trimming mechanism, by raising the second gate 510 at the proper time. This assures a feed of one mushroom at a time, at the proper time in the proper position, to the trimming mechanism reversing conveyor 60, such conveyor being adapted to accept the mushroom cap first.

The water in the tank 414 serves not only to assist in the feeding of mushrooms to the directional orienting means 40 and through the feed-stepping means 50, but such water also helps to maintain the equipment clean by constantly removing any dirt from the conveyors 402 and 404 which might accumulate thereon and by cleaning any dirt from the tubes 502 which might accumulate therein.

As described above, the trimming mechanism comprises generally two roller chain conveyors 60 and 70, each with its own framework, and the former overlying the latter. The upper conveyor 60 is adapted to accept mushrooms, cap first, from the feed-stepping device 50. Such conveyor 60 transports the mushrooms to its under side, where they are then engaged by the lower conveyor 70, to be ultimately cut.

The upper or reversing conveyor 60, as well as the lower or cutting conveyor 70, are each provided with a sufficient number of parallel disposed, laterally spaced operative components so as to be consistent with the number of feed-stepping tubes 502 which are provided; in other words, if there are six flumes in the axially orienting means 30 which feed to six pairs of segmented, spaced conveyors 402 and 404 in the directional orienting means 40, which in turn feed to six downwardly inclined feed-stepping tubes 502, then the upper or reversing conveyor 60 and the lower or cutting conveyor 70 will each be provided with, across their transverse widths, six portions, all operating together in parallel. For example, the upper inverting conveyor 60 is provided at each station, such as 600, 602, and 604 with six mushroom-receiving cavities, 610A, 610B, etc. extending across the width of the reversing conveyor 60 (note particularly FIG. 9).

Each transversely extending row of cavities 610 is maintained together on the conveyor by a transversely extending plate 612 near the outer portion (top along the upper flight) of each cavity 610. Closing the inner portion (bottom along the upper flight) of the cavities 610 is a transversely extending plate or rod 614. The plates 612 are each connected to a pair of endless chains 616 by suitable links 618. In turn, the chains 616, at each transverse side of the conveyor 60, are endlessly driven about suitable conveyor wheels (not shown) which are supported by a suitable supporting structure.

Overlying the outermost end of each mushroom-holding cavity 610 are a pair of transversely extending facing plates 620 and 622 which, during the horizontal top flight of the upper reversing conveyor 60, are coplanar. Such plates 620 and 622 are connected at each end by suitable linkages to the endless chains 616. The plates 620 and 622 define therebetween semicircular openings 624 and 626 which together define circular openings which overlie each mushroom holding cavity 610 as best seen in the exploded view FIG. 9, such circular openings being of approximately the same diameter as the diameter of the cavities 610.

A curved plate 628 is provided adjacent the conveyor 60 as it moves from its upper flight to its lower flight. Such curved plate 628 serves the double function of directing the flow of water passing from above and also preventing the mushrooms from falling out of the cavities 610 as such cavities 610 are turned upside down due to the rotation of the upper conveyor 60 in a counterclockwise direction as viewed in FIGS. 3 and 4.

Thus, the facing plates 620 and 622 and the holding plate 612 for the cavities 610 are attached, along both sides, to the parallel standard roller chains 616 to form the reversing conveyor 60. The facing plates 620 and 622 are alternately mounted in series so that their semicircular holes 624 and 626 form complete circular holes as described above.

The mushrooms leave the feed-stepping tubes 502 with their caps down in synchronized relationship with the movement of the conveyor 60 such that the second gate 510 rises when the flats between the holes, defined by semicircular holes 624 and 626, in the facing plates 620 and 622 are directly beneath the outlet of the feed-stepping tubes 502. As the upper conveyor 60 moves, the mushroom holding cavities 610 together with the holes defined by semicircular opening 624 and 626 line up with the feed-stepping tube 502 outlet, and the mushrooms drop into the mushroom-holding cavities 610, cap downwardly.

The upper conveyor facing plates 620 and 622 shorten the fall of the mushroom as it leaves the terminus of the feed-stepping tube 502 and, even more importantly, provide a positive means to prevent shearing of the mushrooms as the moving mushroom holding cavities 610 pass under the fixed feed stepping tubes 502. As the conveyor 60 continues to move after receiving the mushrooms from the feed stepping tubes 502, it turns along its sprocket wheel and begins to face the curved plate 628, such curved plate 628 preventing the mushrooms from falling out of mushroom holding cavities 610 prematurely. Furthermore, such curved plate 628 catches all of the water that falls from above and directs it through the juncture of the upper conveyor 60 and the lower conveyor 70.

As the upper conveyor 60 has turned about its sprocket wheel to the lower flight thereof, the mushrooms are then pointing root downwardly supported by the bottom end 630 of the plate 628.

Figure 4:
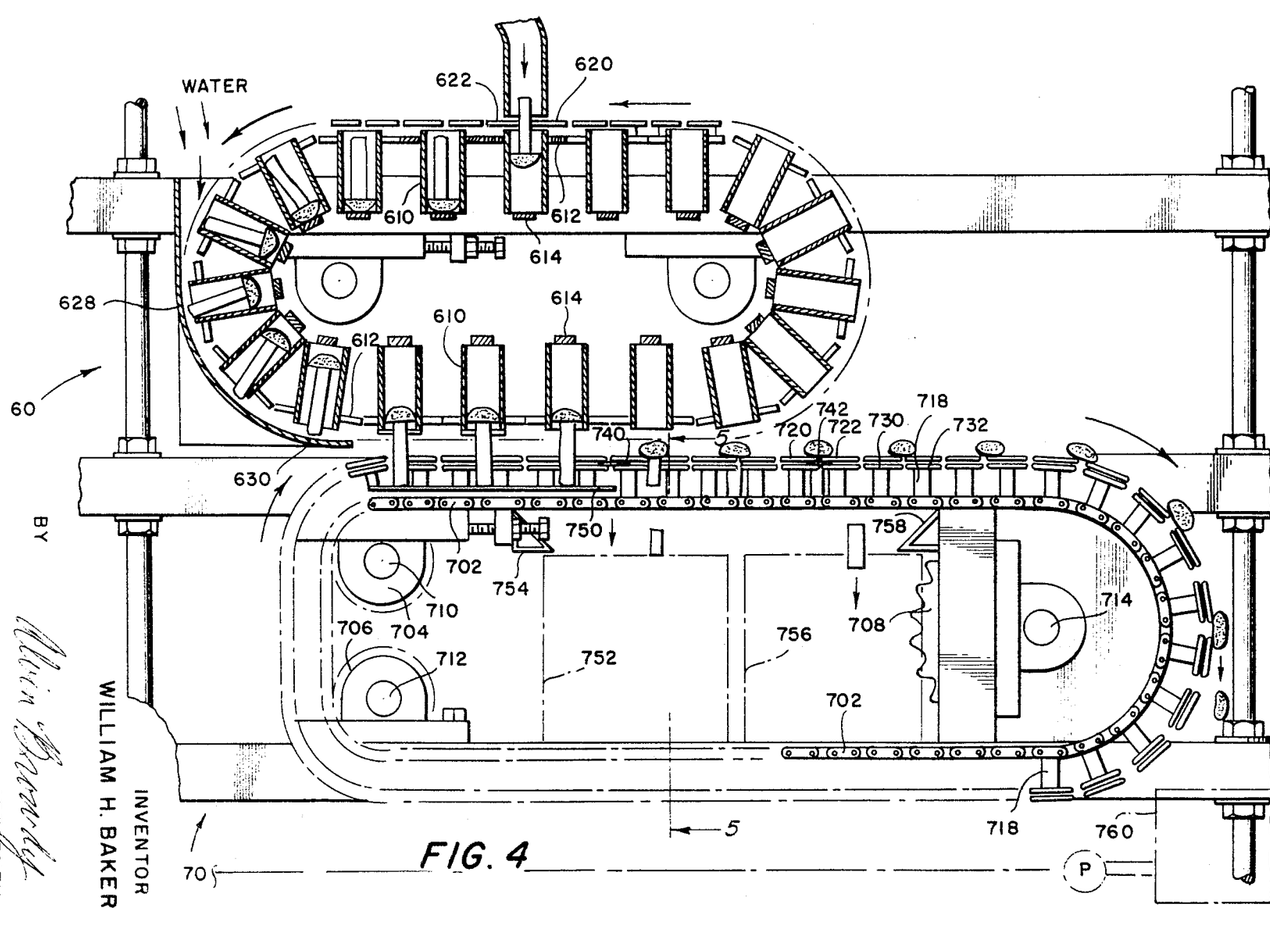
FIG. 4 is a vertical sectional view of an embodiment of the present invention taken downstream from FIG. 3 and showing a reversing conveyor and a cutting conveyor.

The lower or cutting conveyor 70, like the upper reversing conveyor 60, extends transversely in the disclosed embodiment in six rows, there being a standard roller chain 702 for driving and supporting the intermediate structure at each side thereof. The chains 702 are supported by suitable sprocket wheels 704, 706 and 708, at each side thereof, which are in turn supported by suitable axles 710, 712 and 714, respectively. The axles in turn are provided with suitable supporting structure.

Supported by the endless conveyor chains 702 via suitable upstanding lengths 718 are pairs of outer, relatively thin, coplanar facing plates 720 and 722 which define therebetween mushroom stem receiving openings 724A, 724B, 724C, etc., each thin facing coplanar plate 720 and 722, contributing generally semicircular portions to said circular openings 724.

Figure 5:
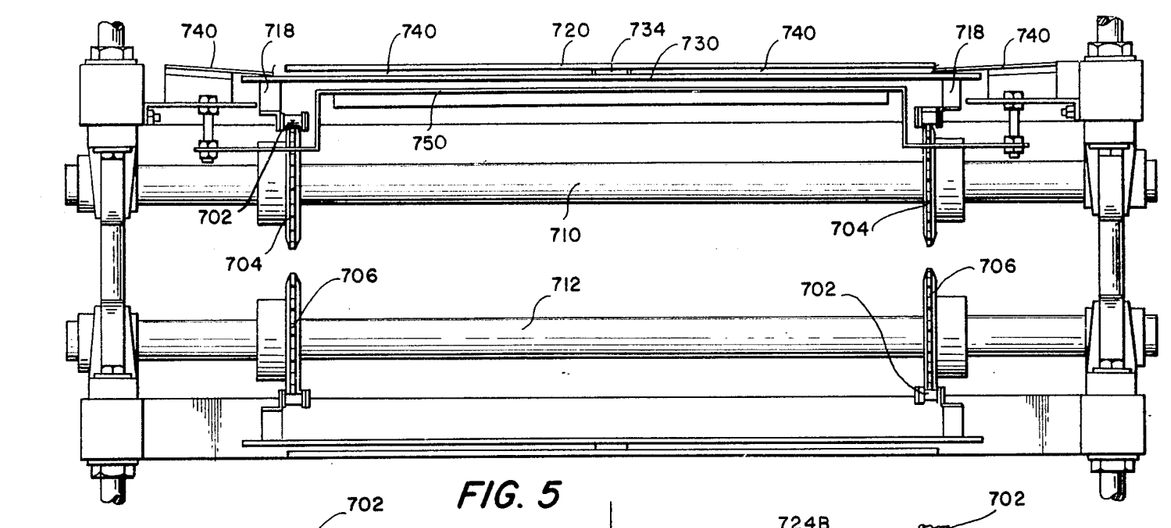
FIG. 5 is a sectional view taken along line 5—5 of FIG. 4.

Lying slightly within (directly below when considering the top flight) of the relatively thin coplanar facing plates 720 and 722 are a second pair of relatively thin coplanar facing plates 730 and 732. The plates 730 and 732 are identical to the plates 720 and 722 with respect to the formation of the openings 724. The plates 730 and 732 differ from the plates 720 and 722 in that they extend transversely (Note FIG. 5) to a greater extent than do the plates 720 and 722, such plates 730 and 732 actually being directly connected to the support elements 718. The upper plates 720 and 722 are in turn supported by the lower plates 730 and 732 via center spacing and supporting elements 734, the upper plates 720 and 722 being essentially cantilevered toward the transverse edges of the conveyor from the center connection 734.

Figure 6:
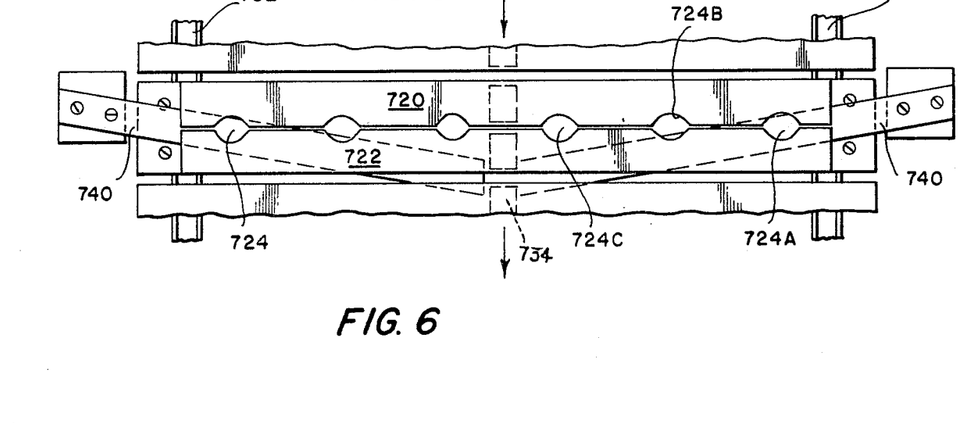
FIG. 6 is a plan view of a detail of the top flight of the cutter conveyor hydraulic FIGS. means; and 5.

Provided along the upper flight of the lower cutting conveyor 70 are suitable sets of cutting blades including a first set 740 and a second set 742. The cutting blades 740 and 742 are provided in pairs, each one of a pair being cantilevered from the side of the conveyor 70 and extending inwardly at an angle as best shown in dotted lines in FIG. 6. The cutting blades 740 and 742 extend between the upper facing plates 720, 722 and the lower facing plates 730, 732 which are separated a distance approximately equal to the thickness of such cutting blades 740 and 742. A stationary root supporting slider plate 750 is provided along the top flight of lower conveyor 70 beneath the lower facing plates 730, 732 and spaced therefrom a distance equal to the average root length of the mushrooms being handled.

The upper reversing conveyor 60 and the lower cutting conveyor 70 are positively synchronized with one another, such that holes or stem receiving depressions 724 in the lower conveyor are aligned with the mushroom holding cavities 610 in the upper conveyor.

The facing plates 720 and 722, and 730 and 732 on the lower conveyor 722 open up as the conveyor turns about its sprocket wheels such as the sprocket wheel 704, as a result of the angular motion of the chains 702. The curved plate 628 of the upper conveyor 20 ends its lower portion 630 at the point where the trailing plates 720 and 730 on the lower conveyor 70 are wide open. Therefore, the mushroom fails, root downwardly, at this point until it bears on the root-supporting plate 750, supported at each transverse edge by the conveyor supporting structure (see FIG. 5). As the two conveyors move, the trailing plates 720 and 730 close to move closer to the leading plates 722 and 732 thereby trapping the stem of the mushroom in the hole formed between the pairs of facing plates. However, the mushroom is not held tight by this action. At this point, the cap of the mushroom is trapped in the mushroom holding cavity 610 of the upper conveyor 60, while the stem is trapped in the holes 724 in the plates of the lower conveyor 70. The mushroom is free to move vertically restricted only by its root resting on the root support plate 750.

All the water passing from the apparatus above, shown diagrammatically in FIG. 4 passing adjacent the curved plate 628, is directed at the juncture of the upper and lower conveyors by the curved plate 628. The force of the water at this point assists in preventing the root of the mushroom from hanging up on the upper trailing plate 720 as the mushroom root engages the lower conveyor. The first cutting blades 740 are mounted along the length of the top flight of the conveyor 70 in the vicinity of the trailing edge of the root support slider plate 750. As the mushrooms are conveyed serially over the root support plate 750, each first engages a first fixed blade 740. That part of the root that extends below the blade 740 is severed from the remainder of the mushroom. Therefore, the amount of root to be cut off can be regulated by raising or lowering the root support slider plate 750. After being cut from the mushroom, the root falls into a suitable hopper 752 shown schematically in FIG. 4. A guide 754 is provided to insure that the root falls within the container 752.

As the mushrooms are serially (and in parallel, six abreast) conveyed beyond the first cutters 740, the unsupported mushroom falls within the generally circular openings 724 until the underside of the mushroom cap rests on the top side of the thin coplanar facing plates 720 and 722. As the mushrooms are further conveyed, each engages a second cutting blade 742 and that part of the stem which extends below the second blade 742 is severed from the mushroom cap. The stem thereupon falls, being guided into a second receiving container shown schematically at 756 and guided by the guide 758.

The cap of the mushroom continues to be conveyed along until it falls off the downstream end of the lower cutter conveyor 70 and into a suitable container located therebeneath. It is preferred that such container for the caps consist of a water holding tank which also catches all the water that falls from above through the cutting mechanism, such tank being shown schematically at 760. The water is pumped from tank 760 back to the first holding tank or reservoir 10 by the pump P shown schematically in FIG. 4, with the result that the water is recirculated continuously.

It will be obvious to those skilled in the art that various changes may be made without departing from the scope of the invention and the invention is not to be considered limited to what is shown in the drawings and described in the specification.

What I claim is:

1. A device for handling mushrooms continuously comprising:
    means for hydraulically feeding mushrooms of a given size:
    means for controlling the rate and quantity movement of the mushrooms being hydraulically fed thereto by said hydraulic feeding means:
    means for axially orienting said mushrooms into at least one row of mushrooms along a single axis corresponding to the axes of the mushrooms with the stem of each mushroom facing either downstream or upstream with respect to the cap thereof, said mushrooms being hydraulically conveyed through said axially orienting means, said axial orienting means being located downstream from said rate controlling means;
    means for directionally orienting said axially oriented mushrooms so that the cap of each mushroom is facing in the same direction, said directional orienting means being located downstream from said axial orienting means; and
    means for cutting said directionally oriented mushrooms into at least two pieces one of said pieces including the cap thereof.

2. A device in accordance with claim 1 further comprising a mushroom reservoir upstream from said rate-controlling means.

3. A device in accordance with claim 1 wherein said means for axially orienting said mushrooms into at least one row along a single axis comprises a water-containing tank means extending lengthwise in the direction of movement of mushrooms; at least one pair of substantially stationary vertical parallel wall members extending in a direction parallel to the length of said tank means and spaced apart approximately slightly greater than the diameter of the caps of the mushrooms being handled, said wall members extending partly beneath the water level of said tank; cooperative baffle means preventing flow of water and mushrooms along any path except between said at least one pair of wall members; and a generally U-shaped bottom between said parallel wall members, said U-shaped bottom beginning at the downstream end of said baffle means and extending downstream between said wall members, said U-shaped bottom being located beneath the water level of said tank to a depth approximately one-half to 1 times the average diameter of the caps of the mushrooms being handled.

4. A device in accordance with claim 3 comprising a plurality of parallel pairs of said parallel spaced-apart wall members located side-by-side; and wherein said cooperative baffle means comprises a first set of generally U-shaped baffles located between said pairs of spaced-apart wall members, said U-shaped baffles connecting the bottoms of said adjacent parallel wall members of different pairs together beneath the water level of said tank and permitting entry of water between the walls of each pair, and a transverse vertical baffle plate blocking the flow of water below said parallel spaced apart wall members, said transverse vertical baffle being located downstream from the upstreammost portion of said U-shaped baffles.

5. A device in accordance with claim 1 wherein said means for axially orienting said mushrooms into at least one row along a single axis comprises
    a water-containing tank means extending longitudinally in the direction of movement of mushrooms and water;
    a plurality of pairs of parallel spaced-apart vertical wall members, the walls of each said pair being spaced apart approximately slightly greater than the average diameter of the caps of the mushrooms being handled, said wall members extending longitudinally with said tank means and extending partly beneath the water level of said tank and partly above the water level;
    a set of generally U-shaped baffles, each connecting the bottoms of adjacent vertical wall members between adjacent pairs of said vertical wall members, whereby the U-shaped baffles are located beneath the water level;
    a transverse vertical baffle plate blocking the flow of water beneath said parallel spaced-apart wall members, said transverse baffle being located downstream from the upstreammost portion of said U-shaped baffles; and
    a generally U-shaped bottom portion between said parallel wall members of each pair of parallel spaced apart wall members and defining therewith a plurality of longitudinal flumes, said U-shaped bottom portions being downstream from said transverse vertical baffle.

6. A device in accordance with claim 5 wherein said means for directionally orienting said axially oriented mushrooms comprises a pair of endless belts in side-by-side relationship at the downstream end of each said flume, the upper surface of said endless belts in the top flight thereof being in the same general horizontal plane with the bottom of said flume, said side-by-side endless belts defining therebetween a truncated V-space sufficiently great to receive the stem of the average diameter mushroom being handled, but such space being smaller than the average cap diameter of the mushroom being handled; a second water-containing tank downstream from said vertical baffle, the water level in said second tank being lower than the level in the first mentioned tank; an upstream supporting wheel for each said belt and a downstream supporting wheel for each said belt, said wheels being of generally the same diameter, the axes of said wheels being generally in the same horizontal plane and lying below the water level in said second tank but the upper portions of said wheels extending above the water level a distance greater than the average length of the mushrooms being handled; a pair of vertical guide plates located between said endless belts and below the top flight thereof, said guide plates being spaced apart slightly a greater distance than the average stem diameter of the mushrooms being handled; and a stem stop means at the downstream end of said belts to retard the longitudinal travel of each mushroom stem while the mushroom cap is being conveyed longitudinally and to rotate the mushroom so that it travels in a cap-first direction.

7. A device in accordance with claim 1 wherein said means for directionally orienting said axially oriented mushrooms comprises a pair of endless belts in side-by-side relationship and defining therebetween a space sufficiently great to receive the stem of the average diameter of mushrooms being handled, but such space being smaller than the average cap diameter of the mushrooms being handled, an upstream supporting wheel for each said belt and a downstream supporting wheel for each said belt, said wheels being so placed that the top flight of said belts are in the same generally horizontal plane, and a pair of vertical guide plates located between said endless belts and below the top flight thereof, said guide plates being spaced apart slightly a greater distance than the average stem diameter of the mushrooms being handled.

8. A device in accordance with claim 1 wherein said means for cutting said directionally oriented mushrooms comprises
means to receive and hold each said directionally oriented mushroom in a generally vertical position and to carry said mushroom through a cutting zone, and at least one generally horizontal cutting blade at said cutting zone for cutting said mushroom into at least two pieces.

9. A device in accordance with claim 1 wherein said means for orienting said mushrooms axially includes a pair of substantially stationary vertical side spaced apart slightly greater than the width of the cap of the mushroom through which said mushrooms are hydraulically conveyed along a single axis.

10. A device in accordance with claim 1 wherein said means for directionally orienting said axially oriented mushrooms comprises a pair of endless belts in side-by-side relationship and defining therebetween a space sufficiently great to receive the stem of the average diameter of mushrooms being handled, but such space being smaller than the average cup diameter of the mushrooms being handled, an upstream supporting wheel for each said belt and a downstream supporting wheel for each said belt, said wheels being so placed that the top flight of said belts are in the same generally horizontal plane.

11. A device in accordance with claim 1 further comprising means for receiving said directionally oriented mushrooms receiving for uniformly refeeding said mushrooms sequentially in timed relationship with one another to said cutting means.

12. A device in accordance with claim 11 wherein said rate-controlling means comprises water-containing tank means extending lengthwise in the direction of movement of mushrooms, water infeed means at the upstream end of said tank means, a first water permeable endless conveyor belt within said tank means having its upstream end submerged beneath the water level in said tank and its downstream and extending above said water level and a second water permeable endless conveyor belt within said tank means downstream from said first endless belt, said second endless belt having its upstream and extending above said water level and its downstream end submerged beneath said water level, whereby mushrooms are first carried onto said first conveyor belt and upwardly thereon and thence into said tank beneath said second conveyor belt to the end thereof.

13. A device in accordance with claim 12 wherein said means for axially orienting said mushrooms into at least one row along a single axis comprises
a first transverse baffle above the downstream end of said second water permeable endless conveyor, said baffle being partly submerged below the water level of said tank;
a plurality of pairs of parallel spaced-apart vertical wall members connected to said first transverse baffle extending downstream therefrom, the walls of each said pair being spaced apart approximately slightly greater than the average diameter of the caps of the mushrooms being handled, said walls extending partly beneath the water level of said tank;
a set of generally U-shaped baffles, each connecting the bottoms of adjacent vertical wall members between adjacent pairs of said wall members and extending downstream from said first baffle, whereby said U-shaped baffles are located beneath the water level;
a second transverse vertical baffle blocking the flow of water beneath said parallel walls, said second vertical baffle being located downstream from said first baffle and said U-shaped baffles, whereby mushrooms passing from the downstream end of said second water permeable conveyor float to the water surface between said first and second baffles and are forced between the vertical wall members of each pair of vertical wall members by said U-shaped baffles; and
a generally U-shaped bottom portion between said walls of each pair of parallel spaced apart wall members downstream from said second vertical baffle, each said pair of walls and U-shaped bottom defining a longitudinal flume for the conveying of water and mushrooms downstream and the simultaneous longitudinal orientation of mushrooms.

14. A device in accordance with claim 11 wherein said device for receiving said directionally oriented mushrooms and for refeeding said mushrooms sequentially in timed relationship with one another comprises
a downwardly sloping tube for receiving mushrooms cap first from said directional orienting means and for also receiving a flow of water for passage therethrough, said tube having an inner diameter slightly greater than the average cap diameter of the mushrooms being handled;
a first gate near the downstream end of said tube, and a second gate adjacent said first gate and spaced therefrom a distance slightly greater than the average cap height of the mushrooms being handled; and
means to synchronously open and close said first and second gates so that one gate is always closed.

15. A device in accordance with claim 14 wherein said means to synchronously open and close said gates comprises a rocker arm for each said gate, each said rocker arm being anchored at one end and connected to its respective gate at the other end; and a rotatable cam wheel located along the length of said rocker arms and having a first and second cam surfaces located 180° apart, each said rocker arm being in engagement with one of the cam surfaces of said cam wheel for movement thereagainst as said wheel rotates 360°.

16. A device in accordance with claim 14 wherein said means for receiving oriented mushrooms in timed relationship and for conveying to a cutting zone comprises
means downstream from said downwardly sloping tube for turning each mushroom upside down so that the cap is on the top;
an endless cutter conveyor for receiving said turned mushrooms the top flight thereof being generally horizontal and having a series of stem receiving depressions therein, said depressions being formed by a pair of relatively thin coplanar facing plates each having a generally semicircular opening therein, said depressions each being slightly larger than the average stem diameter of the mushrooms being handled; and
means for maintaining the vertical distance of each said mushroom in each said depression, said maintaining means being located immediately below the top flight of said endless cutter conveyor; and
wherein said cutting means comprises a first stationary blade located along the top flight of said endless cutter conveyor and immediately below said coplanar facing plates so that as said mushrooms are carried by said plates within said depressions and supported by said maintaining means past said first blade the roots of said mushrooms are cut therefrom; and a second stationary blade located downstream from said first blade and immediately below said coplanar facing plates so that when said mushrooms have moved past said first blade they drop within said depressions to be supported at their caps by said thin facing plates and as said mushrooms are carried by said plates past said second blade the stems are cut from the mushroom caps.

17. A device in accordance with claim 16 wherein said means for turning said mushrooms upside down comprises an endless inverting conveyor containing a series of mushroom-holding cavities each having a diameter slightly greater than the average cap diameter of the mushrooms being handled, each said cavity being adapted to receive a mushroom from said downwardly sloping tube along the upper flight of said inverting conveyor and to hold said mushroom each said cavity travels along said inverting conveyor to the bottom flight thereof; and a curved plate adjacent said inverting conveyor and along at least part of the bottom flight thereof for preventing said mushrooms from falling out of said cavities; and
 wherein said endless cutter conveyor comprises a series of second pairs of thin coplanar facing plates defining a circular opening therebetween, said second pairs of facing plates being spaced below the first mentioned coplanar facing plates a distance equal to the thickness of said cutting blades.

18. A device for the cutting of mushrooms comprising
means to receive mushrooms in sequence in cap-down position;
means for turning each mushroom upside down so that the cap is on the top;
an endless cutter conveyor for receiving said turned mushrooms, the top flight thereof being generally horizontal and having a series of stem receiving depressions therein each formed by a pair of relatively thin coplanar facing plates each said facing plate having a generally semicircular opening therein, said depressions formed by said semicircular openings each being slightly larger than the average stem diameters of the mushrooms being handled;
slider plate means for maintaining a given vertical height of each said mushroom in each said depression, said slider plate being located immediately below the top flight of said endless cutter conveyor; and
a stationary cutting blade located along the top flight of said endless cutter conveyor and immediately below said facing plates so that as said mushrooms are carried in series by said thin coplanar plates of said cutter conveyor within said depressions and supported by said slider plate past said cutting blade the roots of said mushrooms are cut therefrom.

19. A device in accordance with claim 18 further comprising a second stationary cutting blade located downstream from said first-mentioned cutting blade and immediately below said facing plates so that when said mushrooms have moved past said first blade they drop within said depressions to be supported at their caps by said thin facing plates, and as said mushrooms are carried by said plates past said second cutting blade the stems are cut from the mushroom caps; wherein said means for turning said mushrooms upside down comprises an endless inverting conveyor containing a series of mushroom-holding cavities each having a diameter slightly greater than the average cap diameter of the mushrooms being handled, each said cavity being adapted to receive a mushroom in sequence in said cap-down position along the upper flight of said inverting conveyor and to hold said mushroom as each said cavity travels along the path of said inverting conveyor to the bottom flight thereof; and a curved sliding plate adjacent said inverting conveyor and along the portion of said inverting conveyor between the upper and bottom flights and along part of the bottom flight thereof for preventing said mushrooms from falling out of said cavities; and wherein said endless cutter conveyor comprises a series of second pairs of coplanar facing plates defining circular openings therebetween, said second pairs of facing plates being spaced below the first mentioned pairs of facing plates a distance equal to the thickness of said cutting blades whereby said cutting blades slide between opposite facing plate pairs as said cutter conveyor moves.

20. A device in accordance with claim 19 further comprising means to uniformly feed mushrooms sequentially in timed relation with one another to said mushroom holding cavities of said endless inverting conveyor.

21. A device in accordance with claim 20 wherein said means to uniformly feed mushrooms sequentially in timed relation comprises
a downwardly sloping tube for receiving mushrooms cap first, said tube having an inner diameter slightly greater than the average cap diameter of the mushrooms being handled;
a first gate near the downstream end of said tube, and a second gate adjacent said first gate and spaced therefrom a distance slightly greater than the average cap height of the mushrooms being handled; and
means to synchronously open and close said first and second gates so that one gate is always closed.

22. A device in accordance with claim 21 wherein said means to synchronously open and close said gates comprises a rocker arm for each said gate, each said rocker arm being anchored at one end and connected to its respective gate at the other end; and a rotatable cam wheel located along the length of said rocker arms and having a first and second cam surfaces located 180° apart, each said rocker arm being in engagement with one of the cam surfaces of said cam wheel for movement thereagainst as said wheel rotates 360°.

23. A device in accordance with claim 21 comprising a plurality of said downwardly sloping tubes in side-by-side transverse relationship; a plurality of said series of said mushroom holding cavities in side-by-side transverse relationship on said endless turning conveyor, each said sloping tube terminating above a series of said holding cavities; a plurality of said series of stem receiving depressions in said cutter conveyor, said first and second coplanar facing plates extending transversely to define said stem receiving depressions, and each series of holding cavities on said turning conveyor overlying a said series of depressions in said cutter conveyor; and wherein said first and second cutting blades each comprise a pair of blades each of which is cantilevered from adjacent a side of said cutter conveyor and which extends therefrom into said cutter conveyor between said first and second pairs of coplanar facing plates, each said first facing plate being joined to each said second facing plate along a zone lying between the free ends of said cantilevered cutting blades.